United States Patent [19]
Durrell et al.

[11] 3,944,656
[45] Mar. 16, 1976

[54] PROCESS FOR THE PRODUCTION OF CYANOGEN CHLORIDE

[75] Inventors: William S. Durrell, Chappaqua, N.Y.; Robert J. Eckert, Jr., Mobile, Ala.

[73] Assignee: Ciba-Geigy Corporation, Ardsley, N.Y.

[22] Filed: Jan. 10, 1974

[21] Appl. No.: 432,266

[52] U.S. Cl. ............... 423/379; 423/383; 252/444
[51] Int. Cl.$^2$ .......................................... C01B 21/18
[58] Field of Search ........... 423/371, 383, 364, 379; 252/444

[56] References Cited
UNITED STATES PATENTS 3,839,543 10/1974 Geiger et al. .................. 423/379

*Primary Examiner*—Earl C. Thomas
*Attorney, Agent, or Firm*—Karl F. Jorda

[57] ABSTRACT

Production of cyanogen chloride by reacting hydrogen cyanide and chlorine in the gaseous phase in the presence of a low activity carbon catalyst.

5 Claims, No Drawings

PROCESS FOR THE PRODUCTION OF CYANOGEN CHLORIDE

The present invention relates to a process for the production of cyanogen chloride by reacting hydrogen cyanide and chlorine in the gaseous phase.

Cyanogen chloride is a valuable intermediate for the production of cyanuric chloride which is in turn a useful intermediate in the production of herbicides, dyes, chemotherapeutic agents, brightening agents, synthetic resins, plastics, rubber explosives and other materials.

It has already been proposed to produce cyanogen chloride by reacting hydrogen cyanide and chlorine in the gaseous phase in the presence of animal charcoal under the influence of light. (C.A. Vol. 15, (1921) page 2593). This process cannot be used on a technical scale because owing to the poor selectivity of the catalyst larger amounts of by-products, such as dicyanogen and cyanuric chloride, are formed.

It is further known that hydrogen cyanide and chlorine can be reacted in the gaseous phase at a temperature of at least 350°C in the presence of a fluidized activated carbon catalyst to obtain cyanuric chloride as the sole reaction product. (U.S. Pat. No. 2,762,798).

In a further known process hydrogen cyanide and chlorine are reacted in the gaseous phase in the presence of a graphite type carbon catalyst at a temperature of 200° to 600°C to obtain cyanogen chloride in good yield. (Belgian Pat. No. 779,690).

It has now been found that cyanogen chloride can be produced in good yields by reacting hydrogen cyanide and chlorine in the presence of a low activity carbon catalyst.

Accordingly, the present invention provides a process for the production of cyanogen chloride wherein hydrogen cyanide and chlorine are reacted at a temperature within the range of from 190° to 300°C in the presence of a low activity carbon catalyst having a carbon tetrachloride activity of about 10 or lower.

In the process according to the invention hydrogen cyanide and chlorine are used in equimolar amounts or the chlorine is used in an excess of up to 300% calculated on the amount of hydrogen cyanide used. Preferably chlorine is used in an excess of 25 to 75% calculated on the amount of hydrogen cyanide used.

The reaction time, i.e., the time of contact of the reaction mixture with the catalyst is from 0.1 to 5 seconds, preferably 0.2 to 1 second. Within the temperature range of 190° to 300°C given above temperatures of 250° to 290°C are preferred.

As catalyst a low activity carbon of any origin having a carbon tetrachloride activity of 1 to 10 and a grain size of 4 to 14 mesh can be used. Preferably the active carbon used in the process according to the present invention has a carbon tetrachloride activity of 2 to 6. From an economical point of view it is particularly advantageous to use a spent active carbon catalyst previously used in the trimerization of cyanogen chloride to cyanuric chloride.

More specifically, the present invention provides a new process for the production of cyanogen chloride, wherein hydrogen cyanide is reacted with a 25 to 75% molar excess of chlorine at a temperature of 250° to 290°C in the presence of a low activity carbon catalyst having a carbon tetrachloride activity of 1 to 10, the time of contact between reaction mixture and catalyst being 1 to 5 seconds.

In a still more specific aspect the present invention provides an improvement in a process for the production of cyanuric chloride by first reacting hydrogen cyanide and chlorine to form cyanogen chloride and subsequently trimerizing the latter in the presence of an active carbon catalyst to form cyanuric chloride, the improvement comprising performing the reaction of hydrogen cyanide with a 25 to 75% of chlorine at a temperature of 250° to 290°C in the presence of a spent carbon catalyst which was previously used in the trimerization of cyanogen chloride to form cyanuric chloride.

The gas mixture obtained after the performance of the process of the present invention consisting essentially of cyanogen chloride, hydrogen chloride, chlorine and small amounts of cyanuric chloride and hydrogen cyanide can be separated in the usual manner. For example, the mixture can be cooled in order to remove cyanuric chloride and subsequently treated with water to remove hydrogen chloride and hydrogen cyanide. In this manner it is possible to obtain an aqueous hydrochloric acid containing 15 to 20% by weight of hydrogen chloride, which can be immediately used for other purposes or can be sold. The remaining gas mixture consisting essentially of cyanogen chloride and chlorine can be separated by distillation.

According to a further method the gas mixture obtained after performance of the process according to the invention can be separated by extraction with carbon tetrachloride to obtain a solution of cyanuric chloride, cyanogen chloride and chlorine (and hydrogen cyanide) in carbon tetrachloride and gaseous hydrogen chloride. Cyanogen chloride and chlorine are removed from the carbon tetrachloride solution by heating and subsequently separated by distillation. Cyanuric is obtained from the remaining carbon tetrachloride solution by evaporation of the solvent.

Under the reaction conditions specified above cyanogen chloride can be obtained in high yields while the undesirable formation of by-products, such as dicyanogen and cyanuric chloride is substantially avoided. In order to obtain a complete conversion of hydrogen cyanide into cyanogen chloride it is desirable to run the reaction through several reactors in series. Under the conditions specified above the amount of cyanuric chloride formed is below 1% and in most cases even below 0.5% calculated on the amount of hydrogen cyanide used. Thus, in the process according to the invention a gas mixture can be obtained which consists essentially of cyanogen chloride, chlorine, hydrogen chloride and a small amount of cyanuric chloride. From this mixture cyanogen chloride can be easily separated by the carbon tetrachloride extraction method referred to above. A specific advantage of this method resides in the fact that the by-product hydrogen chloride is obtained as a gas which can either be used immediately for other purposes or dissolved in water to obtain a hydrochloric acid of any desired concentration. The invention is further illustrated by way of the following non-limitative examples.

EXAMPLE

General Description of Procedure

A column of an inner diameter of 1 cm equipped with an outer heating device, for example, an outer jacket through which a heat transfer medium can be passed or a heating tape, is used as reactor. As heat transfer media hot water, hot oil or hot air can be used. A layer of low activity carbon catalyst having a height of 80 to 90 cm is placed into the column and hydrogen cyanide and chlorine are introduced at the bottom of the column while the reaction temperature is adjusted by means of the heating device. The feed rate of the gases are controlled and adjusted by means of rotameters. The gas mixture emerging at the top of the reaction column is analyzed to determine the rate of conversion. The results of the single runs are given in the following table.

Based on these activity figures, samples of catalysts for use in runs 139 thru 141 were submitted by Pittsburg Activated Carbon Co. As material was of 12 × 30 mesh, introducing too large a pressure drop across the reactor column, such material was filtered and that retained on a 14 mesh sieve used after diluting with 1/8 inch glass helices.

What is claimed is:

1. A process for the production of cyanogen chloride wherein hydrogen cyanide and chlorine are reacted at a temperature of 90° to 300°C in the presence of a low activity carbon catalyst having a carbon tetrachloride activity of 1 to 10.

Table 1

Run Description-HCN/$Cl_2$ Over Carbon Catalyst

| Run No. | Catalyst | Reactor Column Diameter Height | Temperature | Feed Rates (Mole/Min.) HCN | $Cl_2$ | Conversion to CNCl | Length of Run | Comments |
|---|---|---|---|---|---|---|---|---|
| 1 | Spent plant Catalyst 4-20-64(1) 4 × 6 mesh $CCl_4$ activity 5.9 | 1 cm  80 | 90–100°C by water jacketing | 0.066 | 0.113 | 80–95% | 1 hr | 0.27 sec. contact time. 0.5% conversion to cyanuric chloride (CC) by collecting overhead gas in ambient temperature traps. |
| 2 | Spent plant catalyst 6-6-65(1) 4.6 mesh $CCl_4$ activity 1.8 | 1 cm  80 | 250°C by hot air jacket | 0.033 | 0.073 120% excess | 60–75% | 4 hrs. | 0.31 sec. contact time. Only 0.25% conversion to CC. CNCl conversion leveling out at 60%. Any CC formed removed by sublimation. |
| 3 | Special low activity (<10 by $CCl_4$) carbon supplied by Pittsburgh Activated Carbon Co. | 1 cm  85–90 | 280°C by hot air jacket | 0.074 | 0.074 0% excess | 22–24% | 1 hr. | 0.24 sec. contact time. Due to Δ P across column, material "diluted" 1:1 by volume with ⅛" I.D. glass helices. No CC observed. |
| 4 | Special low activity (<10 by $CCl_4$) carbon supplied by Pittsburgh Activated Carbon Co. | 1 cm  85–90 | 275°C by hot air jacket | 0.026 | 0.096 270% excess | 53–55% | 3–4 hrs. | Contact time 0.30 sec.; no CC. Conversion leveled out. |
| 5 | " | 1 cm  85–90 | 285°C by hot air jacket | 0.034 | 0.053 50% excess | 63–66% | 1.5–2 hrs. | Contact time 0.41 sec. No CC observed. |
| 6 | " | 1 cm  85–90 | 290°C by hot air jacket | 0.018 | 0.032 80% excess | 68–73% | 1 hr. | Contact time 0.71 sec. No CC observed. |
| 7 | " | 1 cm  85–90 | 280°C by hot air jacket | 0.016 | 0.026 60% excess | 57–58% | 1 hr | Contact time 0.86 sec. No CC observed. |

(1) These samples were obtained from the plant unit after previously being observed to be spent. Samples of each were submitted to Pittsburgh Activated Carbon Co. for analysis. The following results were obtained:

| No. | AD g/CC | $CCl_4$ Activity | Mol. No. | 12 No. | Ash |
|---|---|---|---|---|---|
| 4-20-64 | 0.753 | 5.9 | 184 | 181 | 0.06 |
| 6-6-65 | 0.797 | 1.8 | 191 | 133 | 0.06 |

2. A process according to claim 1 wherein chlorine is used in a molar excess of 25 to 75%.

3. A process according to claim 1 wherein the reaction temperature is 250° to 290°C.

4. A process according to claim 1, wherein the contact time is 0.1 to 5 seconds.

5. A process according to claim 1 wherein a low activity carbon having a carbon tetrachloride activity of 2 to 6 and a grain size of 4 to 14 mesh is used as catalyst.

* * * * *